April 25, 1967 W. H. STOUT 3,315,897
INSECT GUARD FOR IRRIGATION NOZZLES
Filed Aug. 17, 1965
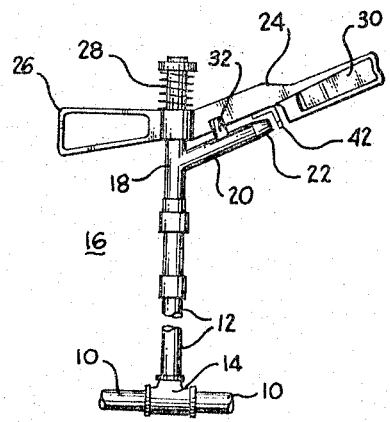
Fig. 1.
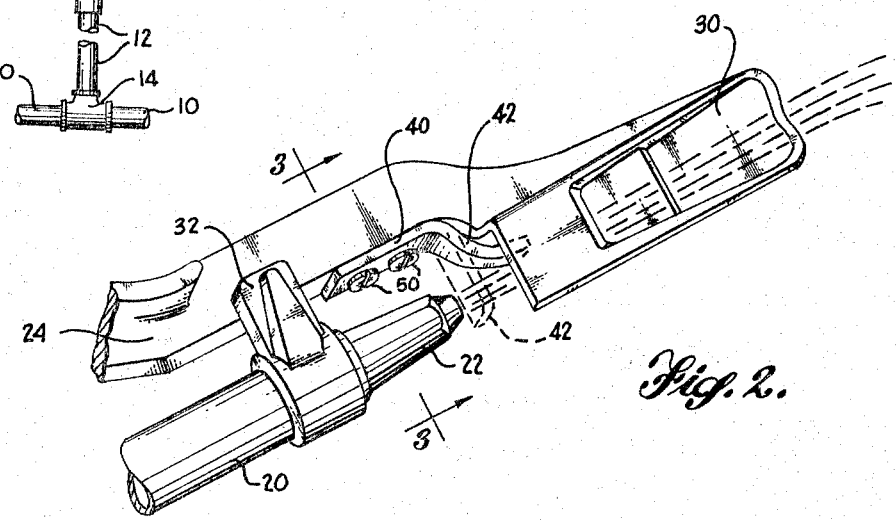
Fig. 2.
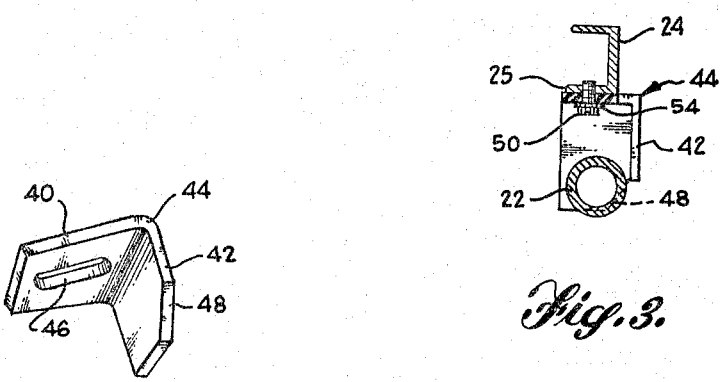
Fig. 3.
Fig. 4.
INVENTOR.
WILLIAM H. STOUT
BY
ATTORNEY 3,315,897
INSECT GUARD FOR IRRIGATION NOZZLES
William H. Stout, 223 N. Jessup, Portland, Oreg. 97217
Filed Aug. 17, 1965, Ser. No. 480,263
4 Claims. (Cl. 239—230)

This invention relates to an insect guard for irrigation nozzles and, more particularly, to apparatus and means for blocking access to a nozzle. In overhead irrigation systems of the mechanical sprinkler type the ingress of insects to the orifice of the nozzle has presented problems.

It has been discovered in the States of Florida and Hawaii, among other places, that "mud daubers," hornets, and other insects are attracted to nozzle orifices. They have packed foreign material into the nozzles so solidly and it is so adhesively attached as to be practically non-removable except by boring or reaming the nozzle. This occurs during quiescent or "off-periods" of the system when the equipment is standing idle. When next the system is activated it will be understood the blocked nozzle is inoperable and the effectiveness of the system is reduced.

It is a primary object of this invention, which is particularly adaptable to nozzles of the type in which there is a swingable arm impelled in a swinging motion which intermittently swings away from and back to the nozzle, to provide closure means for the nozzle orifice which is carried by the swing arm to block the orifice during quiescent periods; and which means does not interfere with operation of the nozzle during active periods by reason of its being displaced from its orifice closing position by the force of a stream of water discharging from said nozzle; and which by reason of its being carried by the arm is in the stream of water an absolute minimum of time, i.e., only that short moment of time when the arm swings into the stream and out of it.

Other objects and advantages of the invention will be more apparent during the course of the following specification in which is set forth a preferred form of the invention. It will be apparent to those skilled in the art that changes and alterations and variations may be made to adapt this invention to the various irrigation nozzles presently available. All such as fall within the spirit and scope of the subjoined claimed subject matter, having due regard to and appropriate application of the doctrine of equivalents, is intended to be covered by this patent.

In the drawings:

FIGURE 1 is a fragmentary side view of a portion of an irrigation system showing an irrigation nozzle on a stem pipe;

FIGURE 2 is an enlarged perspective view of a portion of a nozzle and a portion of the swing arm showing orifice closure means according to this invention in operating position;

FIGURE 3 is a vertical cross-section taken on line 3—3 of FIGURE 2; and

FIGURE 4 is a perspective view of an orifice closure member.

In FIGURE 1 a supply conduit 10 has a stand pipe 12 connected thereto by a conventional T 14. The irrigation nozzle 16 comprises a vertical rotary member 18 and an angularly disposed tubular arm 20 provided with a nozzle tip 22. Mounted thereabove is a swing arm 24 having a counter weight 26 and a biasing spring 28. The forward end of arm 24 has a deflector surface 30 against which a stream of water, discharging from the nozzle tip 22, strikes. The arm 24 then swings in a counter-clockwise direction viewed from above. The arm 24 swings against the bias of spring 28 until the latter overcomes the counter-rotating force applied. Thereupon the arm swings back clockwise toward alignment with the nozzle at which time it strikes the upstanding ear 32 on the nozzle causing the same to be indexed a part of its circle of rotation. It will be understood that these are conventional rotary irrigation nozzles.

A preferred form of orifice closure means is shown in FIGURE 4 to comprise an L-shaped elastic body having angularly disposed arms 40 and 42 joined by an integral, flexible hinge 44. Arm 40 has an elongated slot 46 therethrough and, desirably, a lower corner of arm 42 is lopped off angularly as at 48.

As shown in FIGURE 3, arm 24 has a flange 25 which is drilled and tapped to receive screws 50. An elongated washer 54 is placed between the heads of screws 50 and the under face of arm 40 of the orifice closure member. In FIGURE 4 arm 42 is shown as it would appear in the quiescent period of the irrigation nozzle, where arm 24 is substantially aligned with nozzle 22. In that case, the closure arm 42 is disposed in close proximity to the orifice of nozzle 22 to block the same against ingress by insects and foreign bodies.

Preferably the closure device of FIGURE 4 is formed of rubber or other elastic material of a suitable strength and elasticity to be flexed and unflexed many, many times. The same is shown in the flexed position in FIGURE 2 where a stream of water, ejecting from the nozzle 22, strikes the arm 42 and deflects it upward. The latter is flexed out of the orifice closing position as indicated and due to its resiliency, and the relatively high pressure of the water stream there is no material effect on the stream of water. The lopped off corner 48 of arm 42 facilitates the flexing of the closure arm as it comes in contact with the water stream.

In essence this invention comprises providing a rotatably mounted nozzle, with which is associated an oscillatory arm actuation means operated upon by the force of a stream of water discharging from the nozzle, with an orifice closure member carried by the arm at a location disposed to be in close proximity to the nozzle orifice when the irrigation apparatus is quiescent. The preferred orifice closure member is a resilient member adapted to be flexed or a loaded member otherwise displaced from its normal or closing position by the force of a stream of water discharging from the nozzle during active or sprinkling operation of the irrigation nozzle. By mounting the orifice closure member on the actuation arm its disposition in the stream discharging from the orifice is very brief, only the time that the arm swings into and out of alignment with the nozzle and its orifice. The orifice closure comprises an arm mounted to pivot or swing out of the way under the force of the discharging water stream and, in the absence of such stream, to depend just in front of the nozzle orifice, in such manner as to block the same from the outside.

Having thus described the invention, what is claimed is:
1. The combination, comprising:
   rotatably mounted nozzle having an orifice;
   an oscillatory arm pivotally associated with said nozzle and including actuation means to swing into and out of the axis of said nozzle orifice;
   an orifice closure carried by said arm at a location disposed in close proximity to said nozzle orifice in its axis, said closure being adapted to be displaced from its orifice closing position by the force of a stream of water discharging from said nozzle only during such time as said arm swings into and out of said stream.

2. Apparatus according to claim 1 in which the orifice closure comprises a member pivotally depending from said arm and loaded to close said orifice during non-discharging periods.

3. Apparatus according to claim 1 in which the orifice closure comprises a member resiliently depending from said arm.

4. Apparatus according to claim 3 in which the member is an L-shaped body of rubber having one arm secured to said arm and the other arm disposed in front of said orifice.

References Cited by the Examiner

UNITED STATES PATENTS 3,204,874  9/1965  Senninger _____ 239—230

M. HENSON WOOD, Jr., *Primary Examiner.*

V. M. WIGMAN, *Assistant Examiner.*